United States Patent
Ko (10) Patent No.: US 8,127,030 B2
(45) Date of Patent: Feb. 28, 2012

(54) METHOD AND APPARATUS FOR CONTROLLING NETWORK OF SHARED RESOURCES

(75) Inventor: Jung-Wan Ko, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 574 days.

(21) Appl. No.: 11/502,382

(22) Filed: Aug. 11, 2006

(65) Prior Publication Data

US 2007/0067456 A1 Mar. 22, 2007

(30) Foreign Application Priority Data

Aug. 11, 2005 (KR) .................. 10-2005-0073826

(51) Int. Cl.
G06F 15/16 (2006.01)

(52) U.S. Cl. .................. 709/229; 709/225; 709/220

(58) Field of Classification Search .................. 709/220, 709/225
See application file for complete search history.

(56) References Cited

U.S. PATENT DOCUMENTS

| | | | |
|---|---|---|---|
| 5,896,510 A | 4/1999 | Kanayama | |
| 5,982,780 A | 11/1999 | Bohm et al. | |
| 7,184,848 B2 * | 2/2007 | Krzyzanowski et al. | 700/90 |
| 2004/0073730 A1 | 4/2004 | Horii et al. | |
| 2004/0210695 A1* | 10/2004 | Weber et al. | 710/240 |
| 2005/0108705 A1* | 5/2005 | Koyama | 717/174 |
| 2005/0138137 A1* | 6/2005 | Encarnacion et al. | 709/217 |
| 2007/0005822 A1* | 1/2007 | Yamamoto et al. | 710/15 |

FOREIGN PATENT DOCUMENTS

| | | |
|---|---|---|
| CN | 1510935 A | 7/2004 |
| CN | 1160909 C | 8/2004 |
| CN | 1172495 C | 10/2004 |
| CN | 1805588 A | 7/2006 |
| EP | 1511218 A1 | 3/2005 |
| KR | 1020030075114 A | 9/2003 |
| KR | 1020040029254 A | 4/2004 |
| KR | 1020050025767 A | 3/2005 |
| KR | 1020060008908 A | 1/2006 |

OTHER PUBLICATIONS

Communication dated Sep. 28, 2006, issued by the Korean Intellectual Property Office in counterpart Korean Patent Application No. 10-2005-0073826.
Communication dated May 28, 2007, issued by the Korean Intellectual Property Office in counterpart Korean Patent Application No. 10-2005-0073826.
International Search Report issued Nov. 21, 2006 in corresponding PCT Application No. PCT/KR2006/003133.
Communication dated Nov. 17, 2011, from the State Intellectual Property Office of P.R. China issued in countpart Chinese Application No. 200680029610.8.

* cited by examiner

*Primary Examiner* — Carl Colin
*Assistant Examiner* — Harunur Rashid
(74) *Attorney, Agent, or Firm* — Sughrue Mion, PLLC (57) ABSTRACT

A method and apparatus for controlling networking of resources that can be shared via a network by a plurality of devices on the network are provided. In the method, shared resource information is obtained from a device having at least one shared resource. A topology of shared resources needed for performing an operation based on the obtained shared resource information is configured. The operation corresponding to an object selected by a user is performed by controlling interworking of the shared resources according to the configured topology. Therefore, it is possible to realize an object-oriented method of using shared resources rather than a device-oriented method of using shared resources.

22 Claims, 5 Drawing Sheets

METHOD AND APPARATUS FOR CONTROLLING NETWORK OF SHARED RESOURCES

CROSS-REFERENCE TO RELATED PATENT APPLICATION

This application claims priority form Korean Patent Application No. 10-2005-0073826, filed on Aug. 11, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to utilizing resources of devices in a network.

2. Description of the Related Art

With the development of digital media technologies, various types of digital media devices, for example, digital televisions (DTVs), network servers, and personal video recorders (PVRs) have been developed.

The diversification of multimedia devices, however, has resulted in an economic burden on consumers by exciting consumers' interest. In addition, current home environments are generally not large enough to accommodate a wide variety of multimedia devices.

SUMMARY OF THE INVENTION

The present invention provides a method and apparatus for controlling the networking of shared resources in which an operation corresponding to an object chosen by a user can be efficiently performed by controlling the networking of resources shared by a plurality of devices in a network.

The present invention also provides a computer-readable recording medium storing a computer program for executing the method of controlling the networking of shared resources of devices in a network.

According to an aspect of the present invention, there is provided a method of controlling the networking of resources that can be shared via a network by a plurality of devices on the network, the method comprising: obtaining shared resource information from a device having at least one shared resource; configuring a topology of shared resources needed for performing a predetermined operation based on the obtained shared resource information; and performing the predetermined operation by controlling the interworking of the shared resources according to the configured topology.

According to another aspect of the present invention, there is provided an apparatus for controlling the networking of resources that can be shared via a network by a plurality of devices on the network, the apparatus comprising: an information obtaining unit which obtains shared resource information from a device having at least one shared resource; a topology configuration unit which configures a topology of shared resources needed for performing a predetermined operation based on the obtained shared resource information; and an interworking control unit which performs the predetermined operation by controlling the interworking of the shared resources according to the configured topology.

According to another aspect of the present invention, there is provided a computer-readable recording medium storing a computer program for executing the method of controlling the networking of the resources that can be shared.

According to another aspect of the present invention, there is provided a device comprising: an elementary function module which performs elementary functions that can be shared via a network by a plurality of devices on the network; and a shared resources networking control unit which performs a predetermined operation by controlling the networking of the elementary function module and another elementary function module which can be accessed via the network.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings in which exemplary embodiments of the invention are shown.

Figure 1:
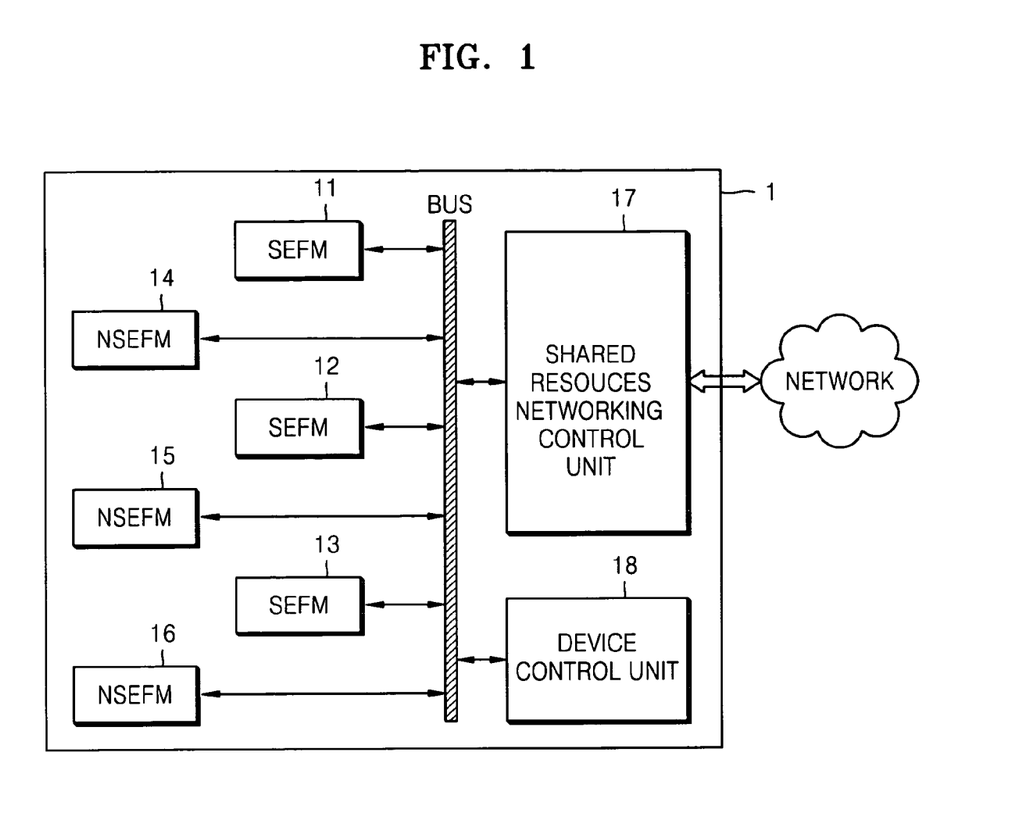
FIG. 1 is a block diagram of a device according to an exemplary embodiment of the present invention.

FIG. 1 is a block diagram of a device 1 according to an exemplary embodiment of the present invention. Referring to FIG. 1, the device 1 includes a plurality of sharable elementary function modules (SEFMs) 11 through 13, a plurality of non-sharable elementary function modules (NSEFMs) 14 through 16, a shared resources network control unit 17, and a device control unit 18. The SEFMs 11 through 13, the NSEFMs 14 through 16, the shared resources network control unit 17, and the device control unit 18 are connected to one another via a bus.

The SEFMs 11 through 13 perform elementary functions that can be shared via a network by a plurality of devices on the network.

The NSEFMS 14 through 16 perform elementary functions that cannot be shared via a network by a plurality of devices on the network.

The shared resources network control unit 17 performs an operation corresponding to an object chosen by a user by controlling the networking of SEFMs of a device other than the device 1, wherein the device other than the device 1 can access the SEFMs 11 through 13 via a network. In other words, the user does not choose and use one of a plurality of devices in a network but merely chooses an object. Then, the shared resources networking control unit 17 controls the networking of SEFMs needed for performing an operation corresponding to the object chosen by the user, thereby realizing an object-oriented shared resources network.

According to the current exemplary embodiment of the present invention, the shared resources networking control unit 17 controls the networking of shared resources according to Universal Plug and Play (UPnP), which is a standard that allows devices in a network to automatically recognize one another. However, the shared resources network control unit 17 can also control the networking of shared resources according to a standard other than UPnP.

The device control unit 18 controls the interworking of the SEFMs 11 through 13 and the NSEFMs 14 through 16, thereby enabling the device 1 to perform its functions.

Figure 2:
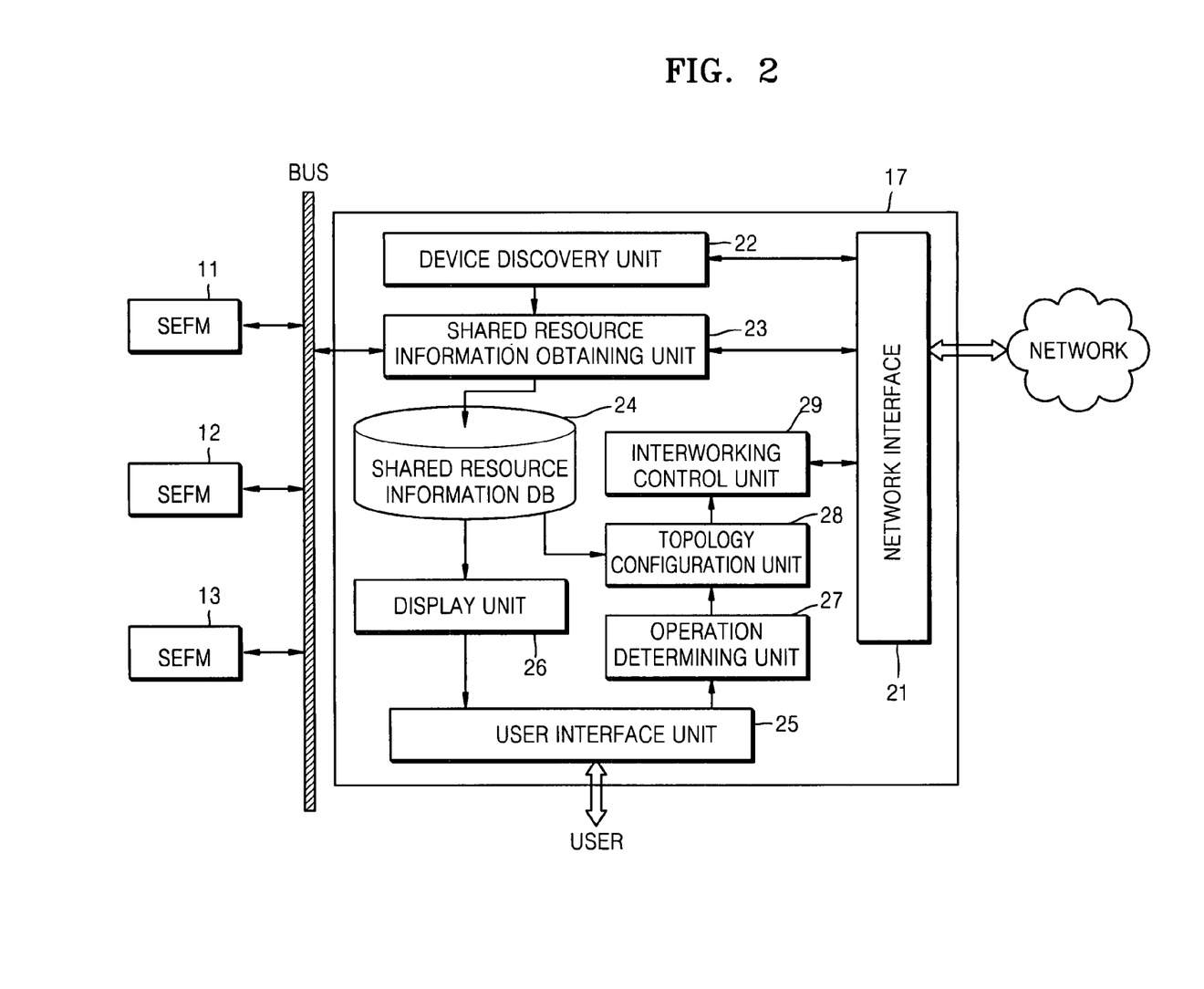
FIG. 2 is a detailed block diagram of a shared resources networking control unit of FIG. 1.

FIG. 2 is a detailed block diagram of the shared resources networking control unit 17 of FIG. 1. Referring to FIG. 1, the shared resources networking control unit 17 includes a network interface 21, a device discovery unit 22, a shared resource information obtaining unit 23, a shared resource information database 24, a user interface 25, a display unit 26, a user request reception unit 27, a topology configuration unit 28, and an interworking control unit 29.

According to the current exemplary embodiment of the present invention, shared resources are SEFMs which are modules that perform elementary functions and can be shared via a network by a plurality of devices on the network. For example, shared resources of a device such as a DTV may comprise a tuner, an audio/video (A/V) decoder, and a display unit.

The network interface 21 connects the device 1 to a network.

The device discovery unit 22 discovers a device having at least one shared resource, i.e., a device having at least one SEFM, from the network via the network interface 21. In detail, the device discovery unit 22 discovers devices having shared resources according to UPnP by using the Simple Service Discovery Protocol.

The shared resource information obtaining unit 23 issues a request for information regarding shared resources of a device discovered by the device discovery unit 22 with the and of the network interface 21 and obtains the requested shared resource information in response to the request via the network interface 21. In detail, the shared resource information obtaining unit 23 obtains shared resource information according to UPnP by issuing a HTTP GET request.

The shared resource information obtaining unit 23 obtains shared resource information which is in conformity with a predetermined standardized format and can thus be recognized by devices on the network. In other words, information regarding SEFMs and information regarding objects that can be processed by such SEFMs are both required to comply with the predetermined standardized format. The standardization of the format of shared resource information enhances the applicability of the current exemplary embodiment of the present invention regardless of types of devices on the network.

The shared resource information database 24 stores shared resource information of the device 1 and the shared resource information obtained by the shared resource information obtaining unit 23. The shared resource information stored in the shared resource information database 24 comprises various information such as information regarding SEFMs of each of the devices on the network and information regarding objects that can be processed by the SEFMs.

The user interface 25 connects the device 1 to a user.

The display unit 26 displays the shared resource information stored in the shared resource information database 24 to the user in such a format as to be immediately recognizable by the user. In detail, the display unit 26 displays to the user a list of SEFMs that are registered in the shared resource information stored in the shared resource information database 24 and a list of objects that can be processed by the SEFMs. For example, the display unit 26 may display to the user an object list including MPEG files, JPEG files, and MP3 files and an SEFM list including a tuner, an AV decoder, and a display unit. Then, the user chooses one of the objects listed in the object list displayed by the display unit 26 and then one of the SEFMs listed in the SEFM list displayed by the display unit using an input device such as a keyboard, a mouse, or a remote control, thereby issuing a request for processing of the chosen object.

The display unit 26 may display parameters of each of the listed objects (e.g., bitrates, codec types, and etc), presentation information of each of the listed objects (e.g., specifications), function information of each of the listed objects (e.g., information indicating whether each of the listed objects is a source module, a processor module, or a sink module), and metadata of each of the listed objects (e.g., title information, director information, and leading actor/actress information, if the listed objects are movies).

An operation determining unit 27 receives via the user interface 25 user input information from a user who has recognized the shared resource information displayed by the display unit 26 and determines what operation needs to be performed in association with the chosen object by referencing the user input information. In detail, the operation determining unit 27 defines the chosen object and then defines a method of processing the chosen object with reference to the user input information, thereby determining the operation that needs to be performed in association with the chosen object. The user input information is information input by a user with the aid of an input device such as a keyboard, a mouse, or a remote control and specifies an object and an SEFM chosen by the user. For example, if a user chooses an MPEG file and then chooses a display unit as an SEFM to process the MPEG file, the operation determining unit 27 defines that the MPEG file is an object chosen by the user and determines that playback of the MPEG file is an appropriate object processing method for the chosen object.

The topology configuration unit 28 configures a topology of shared resources needed for performing the operation determined by the operation determining unit 27, i.e., an operation corresponding to the chosen object. In detail, the topology configuration unit 28 configures a topology of SEFMs that satisfy the definitions of the chosen object and the object processing method determined by the operation determining unit 27 by referencing the shared resource information stored in the shared resource information database 24, and particularly, information regarding the attributes of the chosen object and information regarding shared resources functions (i.e., SEFM functions) needed in the object processing method determined by the operation determining unit 27.

In detail, the topology configuration unit 28 configures a topology in which a source module provides the chosen object, a processor module processes the chosen object, and a sink module outputs the processed result. If the user chooses a source module from the SEFM list displayed by the display unit 26, chooses one of a plurality of objects provided by the chosen source module, and chooses a sink module for the chosen object, the topology configuration unit 28 can automatically choose an appropriate processor module for the chosen source module and the chosen sink module by referencing the shared resource information stored in the shared resource information database 24. Alternatively, the user may choose a complicated operation for the chosen object by choosing an appropriate processor module for the chosen object.

For example, if the chosen object is an MPEG file and an appropriate object processing method for the chosen object is playback of the MPEG file, the topology configuration unit 28 chooses a group of SEFMs that can process the chosen object by referencing information regarding the attributes of the MPEG File and the functions of the SEFMs. Thereafter, the topology configuration unit 28 determines which of the chosen SEFMs is to serve as a source module, a processor module, or a sink module. Thereafter, the topology configuration unit 28 configures a topology of the chosen SEFMs such that the chosen SEFMs are connected in a serial manner from the SEFM that serves as a source module to the SEFM that serves as a processor module and from the SEFM that serves as a processor module to the SEFM that serves as a sink module.

The interworking control unit 29 performs an operation corresponding to the chosen object by controlling interworking of the chosen SEFMs according to the topology configured by the topology configuration unit 28. In detail, the interworking control unit 29 sequentially drives the chosen SEFMs that serve as a source module, a processor module, and a sink module, respectively, so that the chosen SEFMs can interwork with one another.

If the device 1 including the interworking control unit 29 has received a request for performing the operation corresponding to the chosen object from the user, the device 1 serves as a master and thus controls the interworking of the chosen SEFMs. On the other hand, an interworking control unit 29 of a device that communicates with the device 1 as a slave device via a network can perform the operation corresponding to the chosen object. Also, the interworking control unit 29 controls the interworking of the chosen SEFMs according to whether and how much the chosen SEFMs are currently involved in an operation other than the operation corresponding to the chosen object.

For example, if 40% of the chosen SEFMs are currently used in an operation other than the operation corresponding to the chosen object, the interworking control unit 29 may control the interworking of the chosen SEFMs such that 60% of the SEFMs can be used in the operation corresponding to the chosen object. In addition, if 100% of the chosen SEFMs are currently used in an operation other than the operation corresponding to the chosen object, the interworking control unit 29 may delay the use of the chosen SEFMs for the operation corresponding to the chosen object. However, if there are prioritized operations and the operation corresponding to the chosen object among the prioritized operations is the highest priority, the interworking control unit 29 can use the chosen SEFMs regardless of whether the chosen SEFMs are currently used in an operation other than the operation corresponding to the chosen object.

Conventionally, resources are shared by a plurality of devices in a network in such a manner that one of the devices uses some or all of the functions of the other devices in a server-client relationship. According to the current exemplary embodiment of the present invention, however, an object chosen by a user is defined, a method of processing the chosen object is determined, and a topology of shared resources is configured. In other words, according to the current exemplary embodiment of the present invention, a new device that performs an operation corresponding to the chosen object by controlling the networking of shared resources in a network is configured, instead of allowing a device to use resources of another device in a server-client relationship. In detail, the shared resources network control unit 17 configures a topology of shared resources which are resources sharable via a network and controls the interworking of the shared resources, thereby configuring the new device that accomplishes the operation corresponding to the object chosen by the user.

Figure 3:
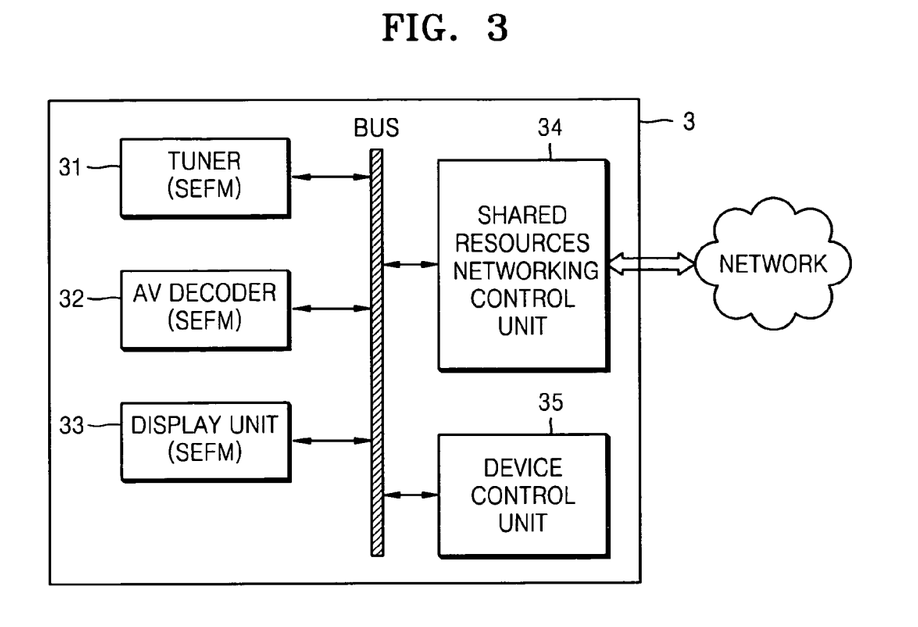
FIG. 3 is a block diagram of a DTV according to an exemplary embodiment of the present invention.

FIG. 3 is a block diagram of a DTV 3 according to an exemplary embodiment of the present invention. Referring to FIG. 3, the DTV 3 includes a tuner 31, an A/V decoder 32, a display unit 33, a shared resources networking control unit 34, and a device control unit 35.

The tuner 31 detects a signal corresponding to one of a plurality of broadcast channels. The A/V decoder 32 restores uncompressed A/V media data by decoding compressed data contained in the signal detected by the tuner 31. The display unit 33 displays the restored A/V media data.

The device control unit 35 controls the interworking of the tuner 31, the A/V decoder 32, and the display unit 33 via a bus, thereby enabling the DTV 3 to perform its own function, i.e., to play back A/V data. In detail, the device control unit 35 sequentially drives the tuner 31, the A/V decoder 32, and the display unit 33 so that the tuner 31, the A/V decoder 32, and the display unit 33 can interwork with one another.

As described above, there is no such restriction that the tuner 31, the A/V decoder 32, and the display unit 33 must be driven inside the DTV 3, and thus, the tuner 31, the A/V decoder 32, and the display unit 33 can be used by a device other than the DTV 3. Therefore, the tuner 31, the A/V decoder 32, and the display unit 33 can be classified as SEFMs.

Figure 4:
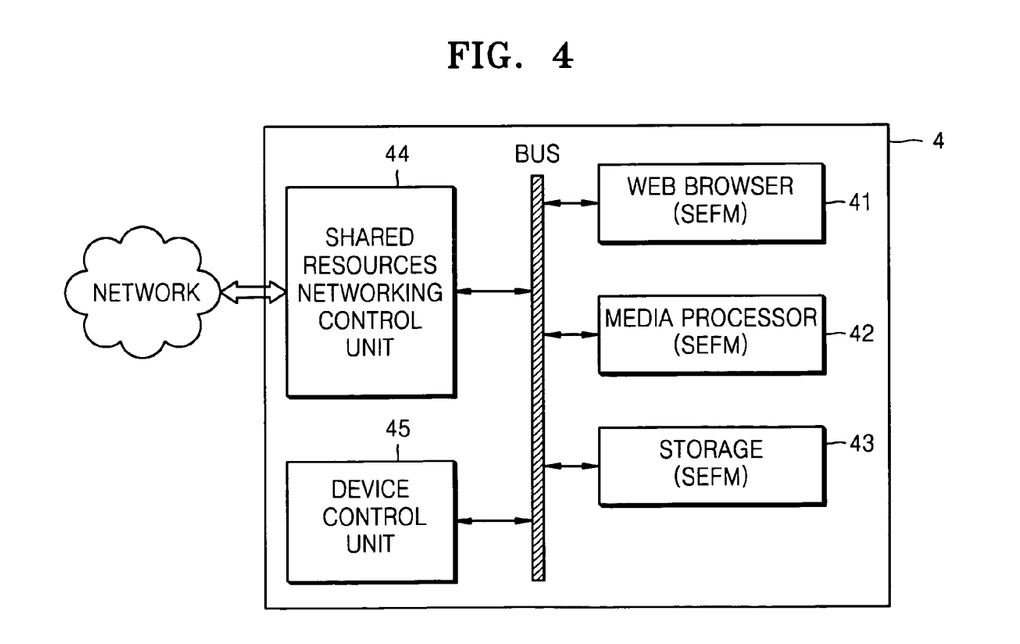
FIG. 4 is a block diagram of a network server according to an exemplary embodiment of the present invention.

FIG. 4 is a block diagram of a network server 4 according to an exemplary embodiment of the present invention. Referring to FIG. 4 the network server 4 includes a web browser 41, a media processor 42, a storage device 43, a shared resources networking control unit 44, and a device control unit 45.

The web browser 41 issues a request for media data to an Internet web server using Hypertext Transfer Protocol (HTTP) and obtains the media data in response to the request. The media processor 42 processes the media data using a predetermined method provided by the network server 4 and stores the processed result in the storage device 43.

The device control unit 45 controls the interworking of the web browser 41, the media processor 42, and the storage device 43 via a bus, thereby enabling the network server 4 to perform its own functions, i.e., to obtain media data and store the obtained media data. In detail, the device control unit 45 sequentially drives the web browser 41, the media processor 42, and the storage device 43 so that the web browser 41, the media processor 42, and the storage device 43 can perform their functions in relation to one another.

As described above, there is no such restriction that the web browser 41 and the storage 43 must be driven inside the network server 4, and thus, the web browser 41 and the storage 43 can be used by a device other than the network server 4. Therefore, the web browser 41 and the storage 43 can be classified as SEFMs. On the contrary, the media processor 42 processes media data using only the predetermined method provided by the network server 4 and thus cannot be used by a device other than the network server 4. Therefore, the media processor 42 can be classified as an NSEFM.

Figure 5:
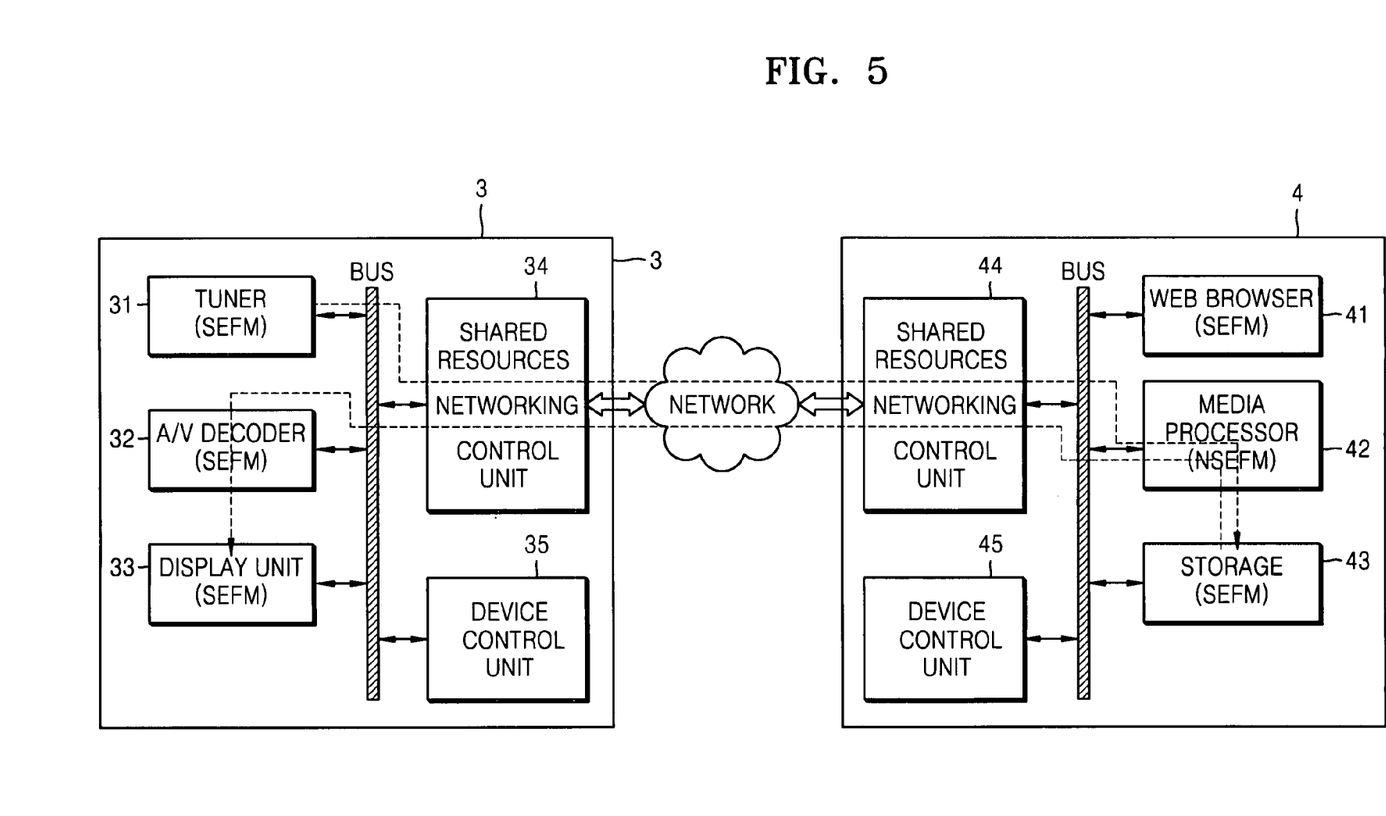
FIG. 5 is a block diagram illustrating the use of shared resources by the DTV of FIG. 3 and the network server of FIG. 4.

FIG. 5 is a block diagram illustrating the use of shared resources by the DTV 3 of FIG. 3 and the network server 4 of FIG. 4 according to an exemplary embodiment of the present invention. Referring to FIG. 5, the DTV 3 and the network server 4 use shared resources to perform functions of a PVR.

A PVR is a device which stores A/V media data in a large storage device and plays back the A/V media data and can thus record moving pictures without an additional recording medium such as a video tape or a DVD.

In order to realize an A/V media data storage function, which is a PVR function, the shared resources networking control unit 44 of the network server 4 receives an A/V media data storage request from a user. Thereafter, the shared resources networking control unit 44, as a master, determines the tuner 31 of the DTV 3 as being a source module, determines the media processor 42 of the network server 4 as being a processor module, and determines the storage device 43 of the network server 4 as a sink module. Thereafter, the shared resources networking control unit 44 configures a topology as indicated by an upper dotted line of FIG. 5 based on the determination results. Thereafter, the shared resources networking control unit 44 stores A/V media data corresponding to a channel chosen by the user by controlling the interworking of the tuner 31, the media processor 42, and the storage device 43 according to the configured topology. In other words, if a user who possesses the DTV 3 and the network server 4 chooses one of a plurality of channels provided by the DTV 3 and chooses the storage device 43 of the network server 4, the shared resources networking control unit 44 of the network server 4 can provide an A/V media data storage function to the user by using shared resources such as the tuner 31, the media processor 42, and the storage device 43 without requiring the user to additionally possess a PVR.

In order to realize an A/V media data playback function which is another PVR function, the shared resources networking control unit 34 receives an A/V media data playback request from a user. Thereafter, the shared resources networking control unit 34, as a master, determines the storage device 43 of the network server 4 as being a source module, determines the media processor 42 of the network server 4 and the A/V decoder 32 of the DTV 3 as being processor modules, and determines the display unit 33 of the DTV 3 as being a sink module. Thereafter, the shared resources networking control unit 34 configures a topology as indicated by a lower dotted line of FIG. 5 based on the determination results. Thereafter, the shared resources networking control unit 34 can play back A/V media data stored in the storage device 43 upon the user's request by controlling the interworking of the storage device 43, the media processor 42, the A/V decoder 32, and the display unit 33 according to the configured topology. In other words, if a user who possesses the DTV 3 and the network server 4 chooses one of a plurality of A/V media files stored in the storage device 43 of the network server 4 and chooses the display unit 33 of the DTV 3, the shared resources networking control unit 44 can provide the user with an A/V media data playback function by using shared resources such as the storage device 43, the media processor 42, the A/V decoder 32, and the display unit 33 without requiring the user to additionally possess a PVR.

Figure 6:
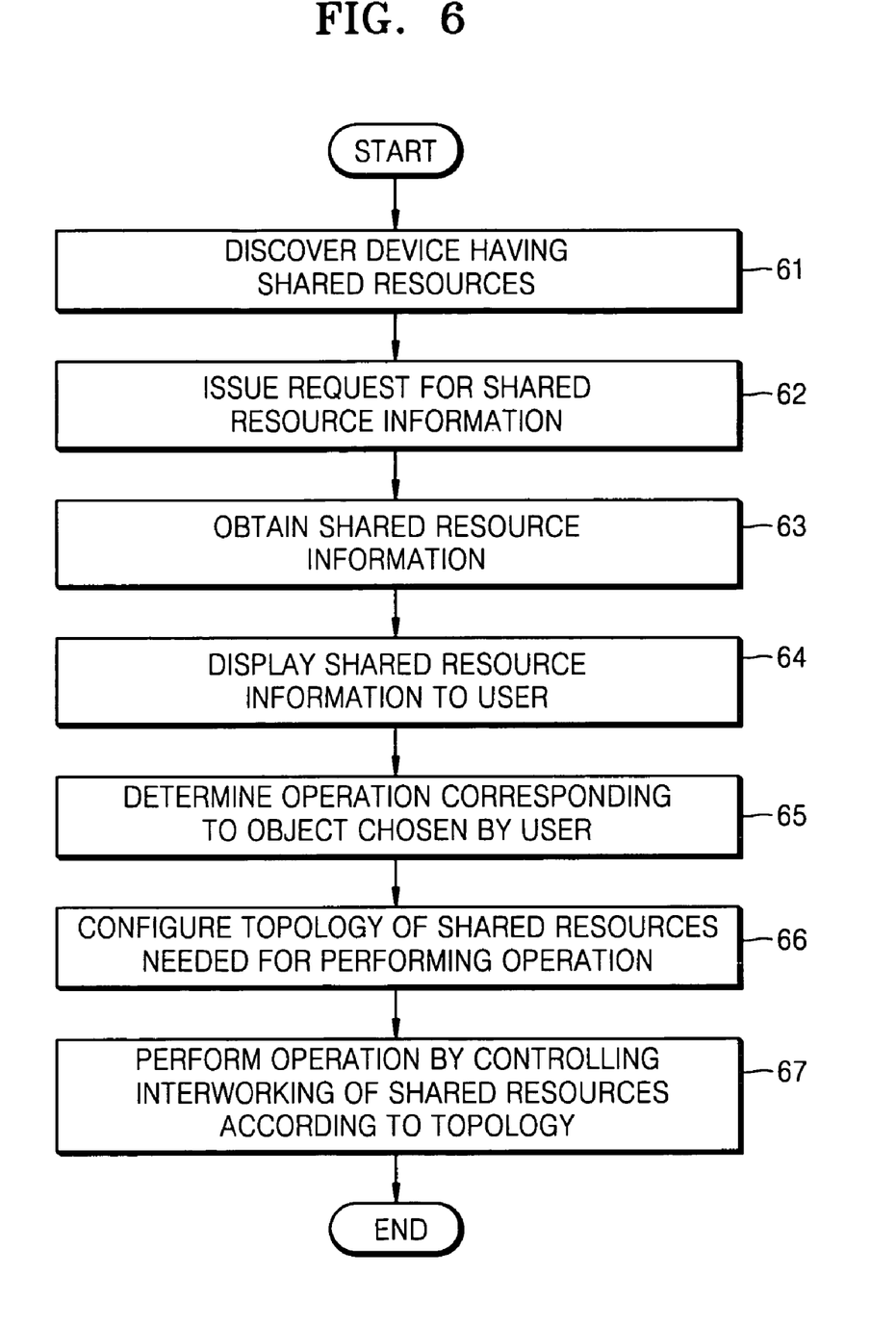
FIG. 6 is a flowchart illustrating a method of controlling the networking of shared resources according to an exemplary embodiment of the present invention.

FIG. 6 is a flowchart illustrating a method of controlling the networking of shared resources according to an exemplary embodiment of the present invention. Referring to FIG. 6, the method comprises a plurality of processes performed by the shared resources networking control unit 17 of the device 1 illustrated in FIG. 1. Therefore, it is obvious that the description of the shared resources networking control unit 17 of the device 1 can directly apply to the method of controlling the networking of shared resources according to an exemplary embodiment of the present invention.

Referring to FIG. 6, in operation 61, the device 1 discovers a device having at least one shared resource, i.e., a device having at least one SEFM, from a network.

In operation 62, the device 1 issues a request for shared resource information to the discovered device.

In operation 63, the device 1 obtains the shared resource information from the discovered device in response to the request the request issued in operation 62.

In operation 64, the device 1 displays shared resource information of the device 1 and the shared resource information of the discovered device in a format recognizable by a user.

In operation 65, the device 1 receives user input information from the user who has recognized the shared resource information displayed in operation 64, and determines an operation corresponding to an object chosen by the user with reference to the user input information.

In operation 66, the device 1 configures a topology of shared resources needed for performing the operation determined in operation 65 by referencing the shared resource information of the device 1 and the shared resource information of the discovered device.

In operation 67, the device 1 performs the operation corresponding to the chosen object by appropriately controlling the interworking of the shared resources according to the topology configured in operation 66.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet).

According to the present invention, an operation corresponding to an object chosen by a user is carried out by appropriately controlling the networking of resources that can be shared by a plurality of devices in a network. Therefore, it is possible to realize an object-oriented method of using shared resources, rather than a device-oriented method of using shared resources, by using the resources of a plurality of devices in a network, instead of using the resources of a single device, for carrying out an operation corresponding to an object chosen by a user.

In addition, according to the present invention, it is possible to maximise the use of SEFMs which can be used for various purposes and to enable devices to perform various functions other than their original functions by dynamically configuring a topology of the SEFMs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling networking of resources that can be shared via a network by a plurality of devices on the network, the method comprising:

obtaining shared resource information from a plurality of devices having shared resources wherein the shared resources comprise a plurality of sharable elementary function modules (SEFM's) included in the devices;

configuring a topology of shared resources needed for performing an operation, which corresponds to an object, based on the obtained shared resource information, by choosing a group of SEFMs that can process the object by referencing information regarding functions of the SEFMs; and performing the operation by controlling interworking of the shared resources according to the configured topology; and wherein the performing comprises:

allowing a device which has received from a request for performing the operation corresponding to the object to control the interworking of the shared resources as a master; and allowing a device which communicates with the device corresponding to the master through the network to perform the operation corresponding to the object as a slave; and controlling the interworking of the shared resources by sequentially driving an SEFM that serves as a source module, an SEFM that serves as a processor module, and an SEFM that serves as a sink module, in which the SEFM that serves as the source module, the SEFM that serves as the processor module, and the SEFM that serves as the sink module are shared resources obtained from the group of SEFMs of the devices.

2. The method of claim 1, wherein the operation corresponds to an object which is selected by a user.

3. The method of claim 1 further comprising determining the operation corresponding to the object by defining the object with reference to input information and determining a method of processing the object.

4. The method of claim 1, wherein the configuring comprises configuring a topology of SEFMs needed for performing the operation.

5. The method of claim 1, wherein the configuring comprises configuring the topology with reference to information regarding attributes of an object corresponding to the operation and information regarding functions provided by the shared resources needed for performing the operation.

6. The method of claim 1, wherein the performing comprises controlling the interworking of the shared resources according to whether and how much the shared resources are involved in another operation which is different than the operation.

7. The method of claim 1, wherein the obtaining comprises obtaining the shared resource information in a standardized format so that the resource information can be recognized by all of the devices on the network.

8. The method of claim 1 further comprising discovering the device having the shared resource,
wherein the obtaining comprises issuing a request for the shared resource information to the discovered device and obtaining the shared resource information from the discovered device in response to the request.

9. The method of claim 8, wherein the shared resources comprise shared resources of a device comprising an apparatus for controlling the networking of shared resources and the shared resources of the discovered device.

10. The method of claim 8, wherein the discovering comprises discovering the device having the shared resource using the Simple Service Discovery Protocol (SSDP) according to Universal Plug and Play (UPnP), and the obtaining comprises obtaining the shared resource information using HTTP GET according to UPnP.

11. The method according to claim 1, wherein the object comprises at least one of an MPEG file, a JPEG file, an MP3 file and an SEFM list.

12. The method according to claim 1, wherein the SEFM comprises a module within a first device which performs functions and can be shared with a second device on the network.

13. An apparatus for controlling networking of resources that can be shared via a network by a plurality of devices on the network, the apparatus comprising:
an information obtaining unit which obtains shared resource information from a plurality of devices having shared resources wherein the shared resources comprise a plurality of sharable elementary function modules (SEFM's) included in the devices;
a topology configuration unit which configures a topology of shared resources needed for performing an operation, which corresponds to an object, based on the obtained shared resource information, by choosing a group of SEFMs that can process the object by referencing information regarding functions of the SEFMs; and
an interworking control unit which performs the operation by controlling interworking of the shared resources according to the configured topology; and
wherein the performs the operation comprises:
allowing a device which has received from a request for performing the operation corresponding to the object to control the interworking of the shared resources as a master; and
allowing a device which communicates with the device corresponding to the master through the network to perform the operation corresponding to the object as a slave, and
controls the interworking of the shared resources by sequentially driving an SEFM that serves as a source module, an SEFM that serves as a processor module, and an SEFM that serves as a sink module, in which the SEFM that serves as the source module, the SEFM that serves as the processor module, and the SEFM that serves as the sink module are shared resources obtained from the group of SEFMs of the devices.

14. The apparatus of claim 13, wherein the operation corresponds to an object which is selected by a user.

15. The apparatus of claim 13 further comprising an operation determining unit which determines the operation corresponding to the object by defining the object with reference to input information and determines a method of processing the object.

16. The apparatus of claim 13, wherein the topology configuration unit configures a topology of SEFMs needed for performing the operation.

17. The apparatus of claim 13, wherein the topology configuration unit configures the topology with reference to information regarding attributes of an object corresponding to the operation and information regarding functions provided by the shared resources needed for performing the operation.

18. The apparatus of claim 13, wherein the interworking control unit controls the interworking of the shared resources according to whether and how much the shared resources are involved in another operation which is different than the operation.

19. The apparatus of claim 13, wherein the information obtaining unit obtains the shared resource information in a standardized format so that the resource information can be recognized by all of the devices on the network.

20. The apparatus of claim 13 further comprising device discovery unit which discovers the device having the shared resource,
wherein the information obtaining unit issues a request for the shared resource information to the discovered device and obtains the shared resource information from the discovered device in response to the request.

21. The apparatus of claim 20, wherein the device discovery unit discovers the device having the shared resource using the Simple Service Discovery Protocol (SSDP) according to Universal Plug and Play (UPnP), and the information obtaining unit obtains the shared resource information using HTTP GET according to UPnP.

22. A non-transitory computer-readable recording medium storing a computer program for executing a method of controlling networking of resources that can be shared via a network by a plurality of devices on the network, the method comprising:
obtaining shared resource information from a plurality of device having shared resources wherein the shared resources comprise a plurality of sharable elementary function modules (SEFM's) included in the devices;

configuring a topology of shared resources needed for performing an operation, which corresponds to an object, based on the obtained shared resource information, by choosing a group of SEFMs that can process the object by referencing information regarding functions of the SEFMs; and performing the operation by controlling interworking of the shared resources according to the configured topology; and wherein the performing comprises:

allowing a device which has received from a request for performing the operation corresponding to the object to control the interworking of the shared resources as a master; and allowing a device which communicates with the device corresponding to the master through the network to perform the operation corresponding to the object as a slave; and controlling the interworking of the shared resources by sequentially driving an SEFM that serves as a source module, an SEFM that serves as a processor module, and an SEFM that serves as a sink module, in which the SEFM that serves as the source module, the SEFM that serves as the processor module, and the SEFM that serves as the sink module are shared resources obtained from the group of SEFMs of the devices.

* * * * *